US012112597B2

(12) United States Patent
Bodosci et al.

(10) Patent No.: US 12,112,597 B2
(45) Date of Patent: Oct. 8, 2024

(54) METHOD FOR A GAMING SYSTEM

(71) Applicant: Play'n Go Marks Ltd, Sliema (MT)

(72) Inventors: Endre Bodosci, Sliema (MT); Charlotte Miliziano, Sliema (MT); Gabor Andrassy, Sliema (MT)

(73) Assignee: Play'n Go Marks Ltd, Sliema (MT)

( * ) Notice: Subject to any disclaimer, the term of this patent is extended or adjusted under 35 U.S.C. 154(b) by 173 days.

(21) Appl. No.: 17/885,798

(22) Filed: Aug. 11, 2022

(65) Prior Publication Data

US 2023/0051858 A1 Feb. 16, 2023

(30) Foreign Application Priority Data

Aug. 12, 2021 (SE) .................................... 2150997-1

(51) Int. Cl.
*G07F 17/32* (2006.01)

(52) U.S. Cl.
CPC ...... *G07F 17/3223* (2013.01); *G07F 17/3211* (2013.01); *G07F 17/3227* (2013.01)

(58) Field of Classification Search
None
See application file for complete search history.

(56) References Cited

U.S. PATENT DOCUMENTS 7,935,974 B2 * 5/2011 Kim ........................ H01L 27/15 257/88
10,445,983 B1 10/2019 Melnick et al.
11,922,762 B2 * 3/2024 Cleveland ........... G07F 17/3239
2004/0166918 A1 8/2004 Walker et al.
2007/0060287 A1 3/2007 Reddicks et al.
2008/0090651 A1 4/2008 Baerlocher
2011/0028202 A1 2/2011 Naicker et al.
2011/0105216 A1 5/2011 Cohen et al.
2014/0221080 A1 8/2014 Cohen et al.
2020/0090449 A1 3/2020 Rajput et al.
2022/0068083 A1 * 3/2022 Miliziano ........... G07F 17/3211
2022/0084357 A1 * 3/2022 Miliziano ........... G07F 17/3211
2022/0148377 A1 * 5/2022 Cleveland .......... G06Q 20/3676

FOREIGN PATENT DOCUMENTS

WO 2016003356 A1 1/2016

OTHER PUBLICATIONS

Swedish Search Report dated Apr. 5, 2022 for Swedish Application No. 2150997-1, 2 pages.
Extended European Search Report dated Dec. 6, 2022 for EP Application No. 22189389.4, 8 pages.

* cited by examiner

*Primary Examiner* — Ronald Laneau
(74) *Attorney, Agent, or Firm* — RMCK Law Group, PLC

(57) ABSTRACT

The present disclosure relates to a computer implemented method performed by a gaming system. In particular, the present disclosure relates to a scheme for further improving an attraction power of a game provided in relation to the gaming system. The present disclosure also relates to a corresponding gaming system and a computer program product.

18 Claims, 5 Drawing Sheets

METHOD FOR A GAMING SYSTEM

CROSS-REFERENCE TO RELATED APPLICATIONS

This application claims priority to Swedish Patent Application No. 2150997-1, filed on Aug. 12, 2021. The disclosure of the above application is hereby incorporated by reference in its entirety.

TECHNICAL FIELD

The present disclosure relates to a computer implemented method performed by a gaming system. In particular, the present disclosure relates to a scheme for further improving an attraction power of a game provided in relation to the gaming system. The present disclosure also relates to a corresponding gaming system and a computer program product.

BACKGROUND

Games of chance are known and widely played for recreational purposes. The gaming industry has come to recognize that to sustain long term success it must be constantly innovative in introducing new games and new gaming concepts to the gaming public. One example of this innovating drive can be appreciated in the embrace of the Internet and online gaming by the gaming industry.

A common trend within the online gaming industry is to provide potentially new and current players with new means for attracting and ensuring that players remain at the online site, controlled by a gaming operator, providing the games.

An example of such a means is the introduction of dynamic game outcomes that change on every spin and or every cascade. The introduction of such dynamic game outcomes introduces further unexpected scenarios to a game which potentially allows a player to be further driven to participate in the game as well as further increase a payout to a player. Such dynamic game outcomes can be implemented by changing the size and or configuration of the slot grid. However, it has been found that such implementations may be visually chaotic.

Furthermore, the possible payouts must be closely controlled by a gaming operator to ensure that the payouts stay within desired boundaries. Thus, there is a general need to balance the attraction power of the game by means of these dynamic payouts, while at the same time ensuring that an operator is in total control of the game.

SUMMARY

According to an aspect of the present disclosure, the above is at least partly met by a computer implemented method performed by a gaming system adapted to execute a series of consecutive games, the gaming system comprising a server arranged in communication with an electronic user device using a network connection, the electronic user device comprising a display screen, wherein the method comprises the steps of forming, at the server, a table having a predetermined dimension and comprising a plurality of cells, generating, at the server, a first set of elements arranged to completely populate all of the plurality of cells of the table, each generated element being one of a plurality of predefined element types, wherein the first set of elements comprises at least one extended element arranged to populate a first predefined number of cells of the table, the predefined number of cells being two or more cells, preferably at least four cells, populating, at the server, the plurality of cells of the table with the first set of elements, controlling, using the server, the electronic user device to display the table at the display screen, identifying, at the server, a cluster of cells of the table being populated with matching elements, forming, at the server, a first gaming outcome based on a successful matching of the identified cluster of cells with a plurality of predefined cluster formations, controlling, using the server, the electronic user device to display the gaming outcome at the display screen, wherein the extended element influences the first gaming outcome based on its size, a number assigned to the extended element, a multiplication factor assigned to the extended elements or a combination thereof.

According to the present disclosure, a novel approach to automatically determine a gaming outcome is defined, where e.g. a backend server has been specifically configured to control an electronic user device in such a manner that the electronic user device automatically displays the gaming outcome at a display screen comprised with the electronic user device. The electronic user device is furthermore generally adapted to at least in some stages of the determination of the gaming outcome display a graphical user interface (GUI) at the display screen, where e.g. a user (also referred to as a player) of the electronic user device is allowed to place a bet to be allowed to participate in a game executed at the server.

In accordance to the present disclosure, at least a portion of the gaming concept involves the player interacting with a table comprising a plurality of cells, where the cells are arranged in rows and columns and where each of the cells is populated with an element. Such elements may for example include different types of elements, for example including numbers and/or symbols of any kind and matching a desired implementation of the game to be played by the player.

The present disclosure makes use of a novel concept where a so called "extended element" is introduced. The extended element is arranged to at least initially "occupy" more than a single cell in the table, such as two or more cells, preferably at least four cells. This extended occupation of the cells may possibly increase the chances for a player of the games to reach a successful gaming outcome. As an example, the extended element may allow for further "reach" in forming a cluster of cells that matches at least one of the pluralities of predefined cluster formations.

As defined above, the extended element influences the first gaming outcome based on its size, a number assigned to the extended element, a multiplication factor assigned to the extended elements or a combination thereof. Accordingly, the extended element may for example influence the gaming outcome by its size alone, a number assigned to it alone, a multiplication factor alone, a size and number assigned to the extended element, a size and multiplication factor assigned to the extended element, or a number assigned to the extended element in combination with the mentioned multiplication factor.

In some embodiments of the present disclosure the extended element may be subdivided in the case the extended element forms part of the identified cluster of cells and a first gaming outcome has been formed. The extended element therefore counts as a single element when determining a winning cluster but subdivides in the case of the extended element forming part of a successful gaming outcome. This implementation will ensure that the table is dynamically and possibly drastically changing within the series of consecutive games, as such further increasing a randomness of the game being played by the player, thereby providing an additional layer of security to for the player, since the increased randomness possibly may ensure that the operator of the server (providing the game) has a lower ability to directly control a specific gaming outcome for the player. At the same time, the operator will be increasing the attraction to the game, possibly resulting in an increase number of players participating in the game provided by the server. In a preferred embodiment of the present disclosure the extended element is subdivided into a second predetermined number of cells being less than the first predetermined number of cells.

Generally, by implementing the gaming system method as defined by the present disclosure has the advantage of improving the randomness of the formed gaming outcome, since the extended element will be allowed to influence the gaming outcome in a highly effective manner. In comparison, in case there potentially would be a flaw in the random number generator used in generating the first set of elements, such a flaw will have a greatly decreased risk of affecting the final gaming outcome of the game. The security of the gaming system can thus be heightened, as compared to the general prior-art random number generators used by other gaming systems.

It may of course be possible to generate random numbers in many different ways. Such methods however typically involve the use of some type of chaotic system. A chaotic system is one with a state that changes over time in a largely unpredictable manner. When using such a chaotic system to generate a random number, there is some means of converting the state of the system into a sequence of bits (i.e., a binary number). However, a chaotic system may not be completely random. More specifically, an adversary observing or wishing to affect the random number source can take advantage of certain localities that may be inherent in the chaotic systems, thus potentially affecting the gaming outcome.

Accordingly, a simple prior art approach for generating random by means of a for example the mentioned chaotic systems could potentially be harmful, because a hostile party can make use of the local properties of the random number generator by simply observing or affecting the system, to determine the generated passwords, thus gaining an advantage for at least partly predicting the gaming outcome. The present disclosure overcomes this problem as has been outlined above. In addition, the present disclosure has the advantage of an improved attraction power to the game, thus potentially allowing for the player to remain playing the game for an increased duration as compared to previously known similar operational schemes. This could potentially be beneficial to both the player participating in the game and the gaming operator providing the game.

A determination of the gaming outcome will automatically be performed by the server based on how the cluster matches the at least one of the pluralities of predefined cluster formations. Some of the of predefined cluster formations will be perceived as more appealing than other of the predefined cluster formations. However, generally speaking the number and location of matching elements within the table (i.e. within the cluster) will define the first gaming outcome.

The concept of matching elements may be differently defined based on the type of game, but in one embodiment a set of matching elements are defined in case at least a predetermined number of matching cells (within the table) have been identified by the server. As an example, in one embodiment it is necessary that at least five matching elements are identified for the server to determine the gaming outcome. It may of course be possible to define the predetermined number of matching cells to be more of less than five matching elements, such as anywhere between 2-10 matching elements. The number of matching elements and their location is then influenced by the multiplication factor for determining the gaming outcome.

In some embodiments a cluster may be determined as "identified" if e.g. at least a predetermined number of cells comprising matching elements are located adjacently to each other. The predetermined number of cells may for example again be five, however this predefined number may also be lower or higher. The definition of "adjacently" may be dependent on the specific implementation of the present scheme. For example, adjacently may be defined as arranged on the same row of the table or in the same column of the table. It may however also be possible to allow other cluster formations to be seen as adjacent, such for example comprising a combination of cells arranged both on different columns and on different rows, but at least sharing a side of a cell to another cell holding a matching element. Other definitions of clusters comprising matching elements are of course possible and within the scope of the present disclosure. Such a further example of a cluster may be where matching elements form specific "shapes", but not necessarily share a cell side with each other. Thus, two adjacent cells may possibly, in some embodiments, be seen as two cells at least having "touching" cell corners.

It should be understood that the shape of the cluster possibly may influence the gaming outcome. As an example, in some embodiments in comparison more "complex" clusters comprising specifically "unusual" elements may generate a different gaming outcome as compared to a less complex cluster comprising "common" elements.

Even though an example is given above as to a cluster comprising matching elements are located adjacent to each other, it should be understood that the gaming outcome generally, and as suggested above, also may be determined just by the fact that the table comprises at least the predetermined number of matching elements.

Preferably, a multiplication factor is assigned to the extended element, and the first gaming outcome is dependent on the multiplication factor. As such, the server will take the multiplication factor into account when the first gaming outcome is determined, so for example, you might have a 4×4 extended element that includes a multiplication factor of 2 on it. If you win with the 4×4 extended element, then that 4×4 extended element will count as 2 symbols. Similarly to the above, such an embodiment will further enhance the randomness of the game and as such improve the ability to get the player to continue to play the game.

The multiplication factor may in some embodiments of the present disclosure "stay" with (or assigned to) the separate portions of the extended element when being subdivided. Accordingly, also future gaming outcomes will as such be dependent on also the initially assigned multiplication factor. In an alternative embodiment it may be possible to allow the multiplication factor to be "divided" depending on the number of cells the extended element is subdivided into. For example, if the initial extended element populates four cells, and the multiplication factor is four, then if the extended element may be subdivided into two separate portions and correspondingly the multiplication factor may be divided by two.

In some embodiments the multiplication factor follows the extended element and will as such "disappear" when the extended element has been subdivided to just populate a single cell. In some other embodiments the multiplication factor will stay for a predefined number of games within the sequence of games.

Preferably, the multiplication factor has a predefined range. For example, the range may be between one to 10, preferably one to six and most preferably one to four. Correspondingly, the predefined number of cells is defined to be at least four cells, but could possibly be at least six, eight, 10, etc.

In some embodiments it may be possible to further increase the randomness (and thus also the security) of the game by introducing a generic type element, in some embodiments defined as a wild card or a joker element, where the generic type element may be matchable to all of the plurality of predefined element types. As such, the generic element type may be equally matchable with e.g. a number as well as a symbol. The generic element may as such form further, more complicated clusters or be included when determining the number of matching elements within the table. The introduction of the generic type element may possibly generate an increased payout to the player, increase the attractiveness of the game, promote the player to continue playing the game, while at the same time balancing the risk for the operator of the gaming system.

Preferably, one or a plurality of generic type elements are comprised with the set of elements corresponding to the plurality of cells, as generated by the server. Accordingly, new generic elements are potentially generated for each set of elements generated for each of the game in the series of consecutive games. It may however be possible, and within the scope of the present disclosure, to allow also the generic type element(s) to have a predetermined lifetime, meaning that the generic type element(s) potentially could remain within the same cell for a predefined number of consecutive games. Such embodiments may even further allow for operator controllability of the gaming system, while also possibly increasing the payout for the player.

In some embodiments of the present disclosure the series of consecutive games are games of chance, such as for example including a slot game, where the player is placing a bet to be allowed to participate in the game (or series of games). The gaming outcome may in such an embodiment be dependent on the bet placed by the player.

The concept according to the present disclosure may however be applied to other types of games, including e.g. sports bet or similar, where the gaming outcome generated by means of the present scheme may be used for e.g. allowing the player to increase a total outcome generated by e.g. a sports bet.

As indicated above, the server is in charge of controlling the electronic user device to display the table as well as the gaming outcome at the display screen of the electronic user device. In some embodiments the electronic user device is adapted to present a graphical user interface (GUI) at the display screen. The server may in a corresponding manner be adapted to a graphical representation of at least one of the table or the gaming outcome, to be distributed to the electronic user device, where the graphical representation is then presented within the GUI.

Such a GUI may also be arranged to allow the player to directly interact with the server, for example allowing the player to control his/her participation in the game as well as to control a size of the bet placed when participating in the game.

Within the context of the present disclosure the expression "forming a graphical representation" should be interpreted broadly. Specifically, it should be understood that the server in some embodiments may be configured to only form a collection of "meta-data" (here corresponding to the graphical representation) that will be rendered at the frontend, such as within the GUI of the electronic user device. However, in another embodiment it may be the other way around, meaning that the server will essentially form an image (here corresponding to the graphical representation) that then will be displayed within the GUI of the electronic user device. Further alternative implementations along the same mutations are possible and within the scope of the present disclosure. Additionally, it may also be possible to allow the graphical representation to be set differently for different game operators, players or groups of players. The graphical representation may also be dependent on e.g. the geographical location of the players, such as dependent on city, country or continent where the player is located/registered.

Within the context of the present disclosure, it should be understood that in some embodiments it may be possible to allow the server to control if a specific electronic user device is to be allowed to apply the scheme according to the present disclosure. Such control may for example be dependent on a geographical location of the electronic user device. Possibly, the geographical location may be selected from a group comprising a city, a country, and a continent.

According to another aspect of the present disclosure there is provided a gaming system comprising a server arranged in communication with an electronic user device using a network connection, the electronic user device comprising a display screen, wherein the server is adapted to form a table having a predetermined dimension and comprising a plurality of cells, generate a first set of elements arranged to completely populate all of the plurality of cells of the table, each generated element being one of a plurality of predefined element types, wherein the first set of elements comprises at least one extended element arranged to populate a first predefined number of cells of the table, the predefined number of cells being two or more cells, preferably at least four cells, populate, the plurality of cells of the table with the first set of elements, control the electronic user device to display the table at the display screen, identify a cluster of cells of the table being populated with matching elements, form a first gaming outcome based on a successful matching of the identified cluster of cells with a plurality of predefined cluster formations, control using the server, the electronic user device to display the gaming outcome at the display screen, wherein the extended element influences the first gaming outcome based on its size, a number assigned to the extended element, a multiplication factor assigned to the extended elements or a combination thereof. This aspect of the present disclosure provides similar advantages and embodiments as discussed above in relation to the previous aspects of the present disclosure.

Preferably, the gaming system is a cloud-based computing system and the server is a cloud server. Thus, the computing power provided by means of the invention may be distributed between a plurality of servers, and the location of the servers must not be explicitly defined. Advantageous following the use of a cloud-based solution is also the inherent redundancy achieved.

In some embodiments the electronic user devices may be selected to include e.g. a computer (laptop/stationary), a mobile phone, a tablet, a (gaming) consoles or any other gaming device and gambling terminals. The GUI may in some embodiments be allowed to depend on the type of electronic user device.

According to a still further aspect of the present disclosure there is provided a computer program product comprising a computer readable medium having stored thereon computer program means for operating a gaming system, the gaming system comprising a server arranged in communication with an electronic user device using a network connection, the electronic user device comprising a display screen, wherein the computer program product comprises code for forming, at the server, a table having a predetermined dimension and comprising a plurality of cells, code for generating, at the server, a first set of elements arranged to completely populate all of the plurality of cells of the table, each generated element being one of a plurality of predefined element types, wherein the first set of elements comprises at least one extended element arranged to populate a first predefined number of cells of the table, the predefined number of cells being two or more cells, preferably at least four cells, code for populating, at the server, the plurality of cells of the table with the first set of elements, code for controlling, using the server, the electronic user device to display the table at the display screen, code for identifying, at the server, a cluster of cells of the table being populated with matching elements, code for forming, at the server, a first gaming outcome based on a successful matching of the identified cluster of cells with a plurality of predefined cluster formations, code for controlling, using the server, the electronic user device to display the gaming outcome at the display screen, wherein the extended element influences the first gaming outcome based on its size, a number assigned to the extended element, a multiplication factor assigned to the extended elements or a combination thereof. Also this aspect of the present disclosure provides similar advantages and embodiments as discussed above in relation to the previous aspects of the present disclosure.

The computer program product is typically executed using a computing device comprised with the server, preferably including a microprocessor or any other type of computing device. Similarly, a software executed by the server for operating the gaming system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Accordingly, operation of the gaming system may be at least partly automated, implemented as e.g. software, hardware and a combination thereof.

Further features of, and advantages with, the present disclosure will become apparent when studying the appended claims and the following description. The skilled addressee should realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
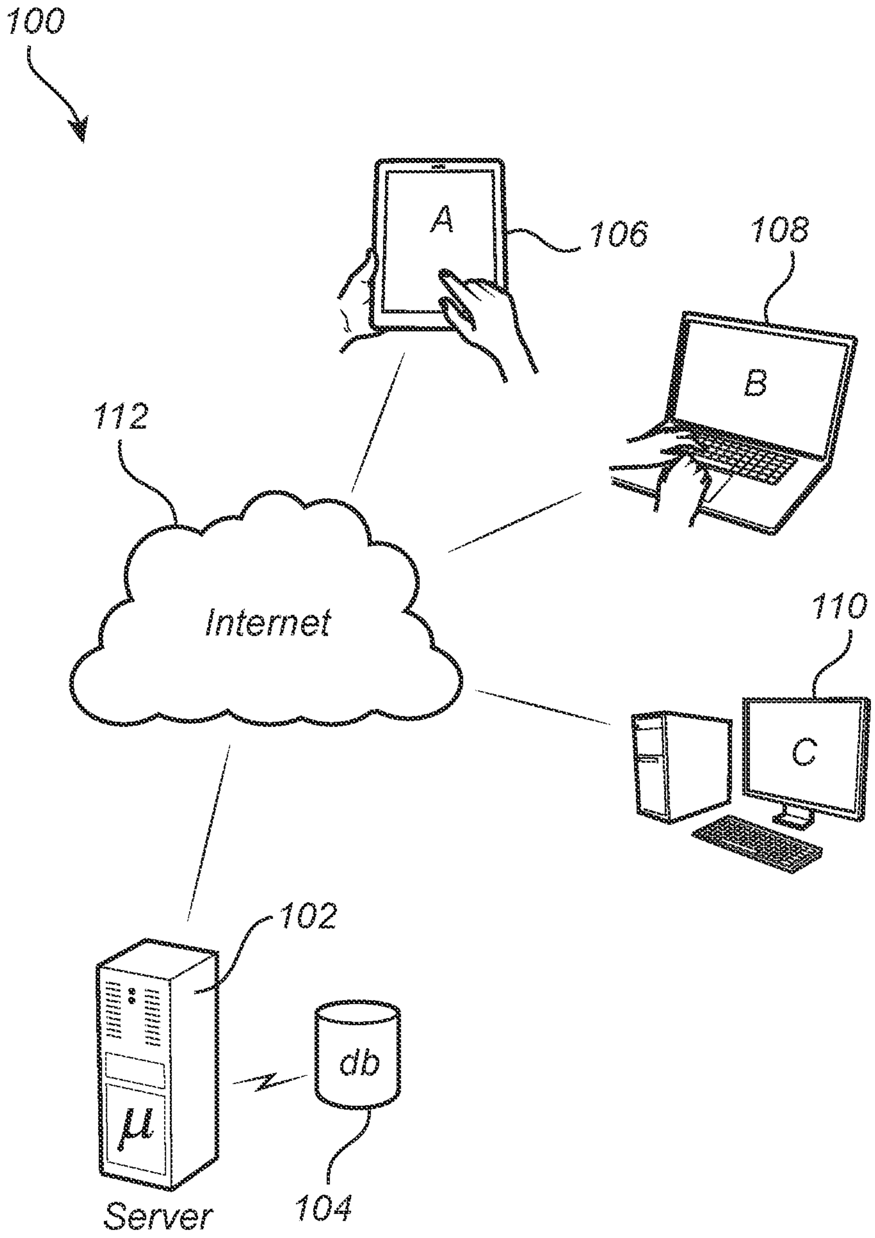
FIG. 1 illustrates an exemplary gaming system according to a currently preferred embodiment of the present disclosure, FIG. 2 provides an exemplary illustration of a typical graphical user interface (GUI) for use in playing a game.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness to fully convey the scope of the present disclosure to the skilled addressee. Like reference characters refer to like elements throughout.

Referring now to the drawings and FIG. 1 in particular, there is depicted a gaming system 100 in which an online game, such as a slot game, may be played according to a currently preferred embodiment of the present disclosure. The system architecture illustrated in FIG. 1 depicts a system environment in which systems, methods, apparatus, computer-readable mediums and data structures consistent with the principles of some embodiments of the present disclosure may be included. It may be appreciated that the components of system 100 may be implemented through any suitable combinations of hardware, software, and/or firmware.

As shown in FIG. 1, system 100 includes at least one server 102 and/or at least one gaming database 104. Server 102 and gaming database 104 may be communicably linked to a plurality of electronic user devices in the form of electronic user devices, such as client devices 106, 108, 110, etc. through network 112. The network 112 may be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar. As such, the network 112 may be locally and/or globally provided.

The gaming database 104 may be any type of physical unit on which games reside, such as a machine in a gaming venue, a lottery machine, an electronic game system, etc. Network 112 may be implemented as the Internet, or any local or wide area network, either public or private. Network 112 may also be a hardware system physically connecting some or all of the server 102 and client devices 106, 108, 110. Client devices 106, 108, 110, typically each operated by a player, may be implemented as any computing devices such as a personal computing device, a server, a server network, handheld computing device, slot machine, other gaming machine in a gaming venue such as a betting terminal, a gaming console, lottery machine, an interface in a virtual environment, etc.

It may be appreciated by one of ordinary skill in the art that while only one server, one gaming database, one network and two client devices are depicted, more or fewer servers, more or fewer gaming databases, more networks and more or fewer client devices and/or other devices may reside within system 100.

The elements inside system 100 may include one or more (micro) processors, purpose-built hardware such as, for example, FPGA, ASIC, etc., software systems and applications, software packages, mechanical and electrical parts, etc. Software packages that may be part of server 102, gaming database 104, client devices 106, 108, 110 and network 112 may be recorded on a computer readable medium such as a memory device, RAM, CD/DVD/USB drives, handheld memory device, etc., and/or may be part of a physical device such as one or more (microprocessors or electro-mechanical systems. Any of server 102, gaming database 104, client devices 106, 108, 110, network 112 and further electronic user device 114 may be fixed systems, mobile systems, portable systems, or cloud systems (as discussed above). FIG. 1 shows only three electronic user devices 106, 108, 110, however it should be understood that a general implementation of the present disclosure comprises a large plurality of electronic user devices, possibly greatly above three, such as 100, 1000, 10000, etc.

Although the various components of FIG. 1 are illustrated as discrete elements, it should be recognized that certain operations of some of the various components may be performed by the same physical device, e.g., by one or more microprocessors or other type of devices.

Figure 2:
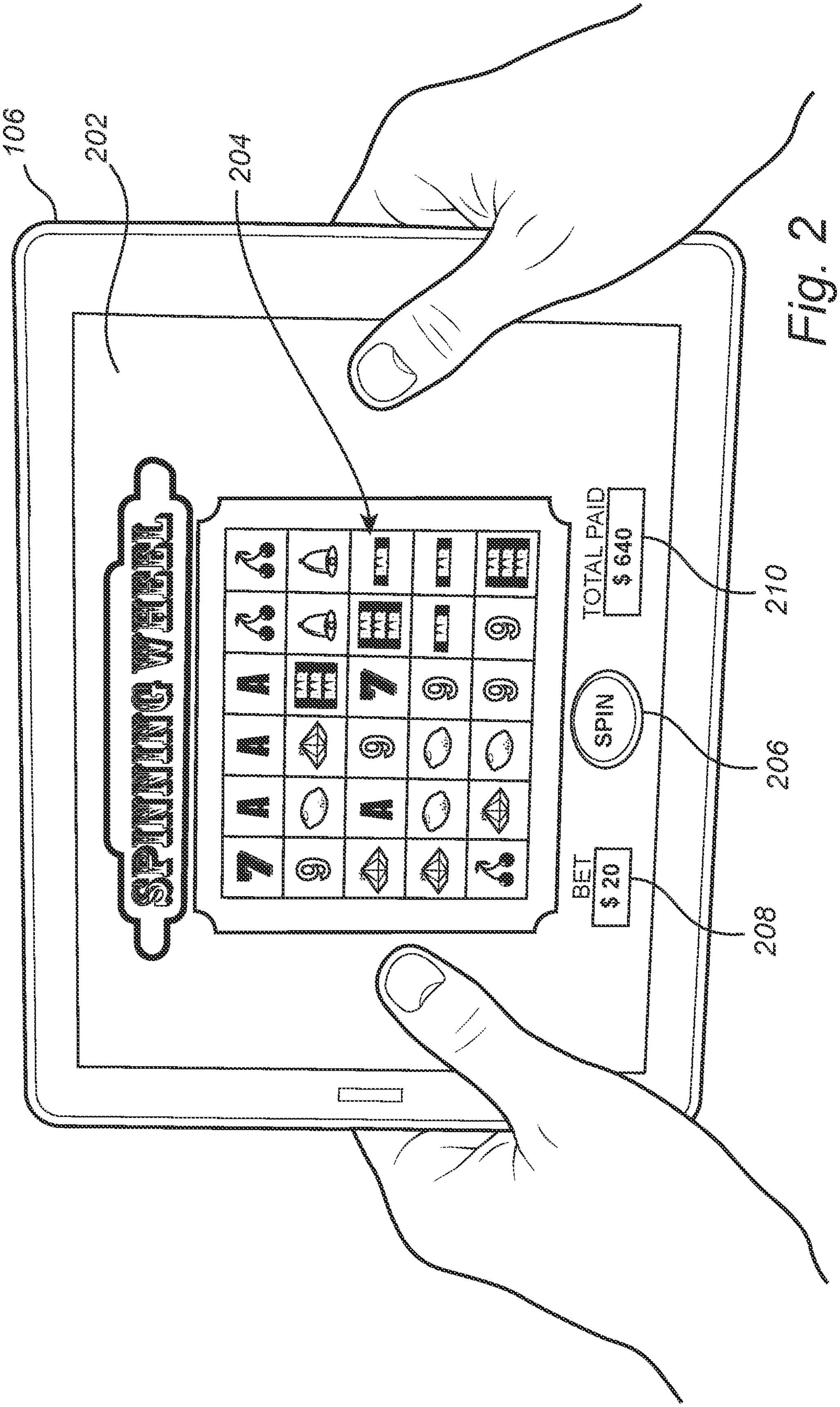

Turning now to FIG. 2 illustrating a graphical user interface (GUI) 202 to be displayed at a client device, such as any of the client devices 106, 108, 110, in the illustrated embodiment provided as an application ("app") or within e.g. a web browser of the portable client device 106 being a tablet. The game to be played at the client device 106 is here shown as an online game of chance in the form of a slot game, visualized within the GUI 202 as comprising a table comprising six individual reels 220, 222, 224, 226, 228, 230 arranged in columns and provided with a plurality of different symbols. The table also comprises five rows 240, 242, 244, 246, 248. As such, the predefined dimension of the table as shown in FIG. 2 is six times five, thus comprising 30 cells in total.

The GUI also comprises a "button" 206 to start the game, here provided with the description "SPIN" for initiating a turn of the game. In addition, the GUI 202 comprises an indicator of the current bet 208 (i.e. payment for each turn of the game) and an indicator of the total payment to the player 210. It should in any case be understood that other types of games may be played within the scope of the present disclosure, for example being skill based as compared to a game of chance.

Figure 3A:
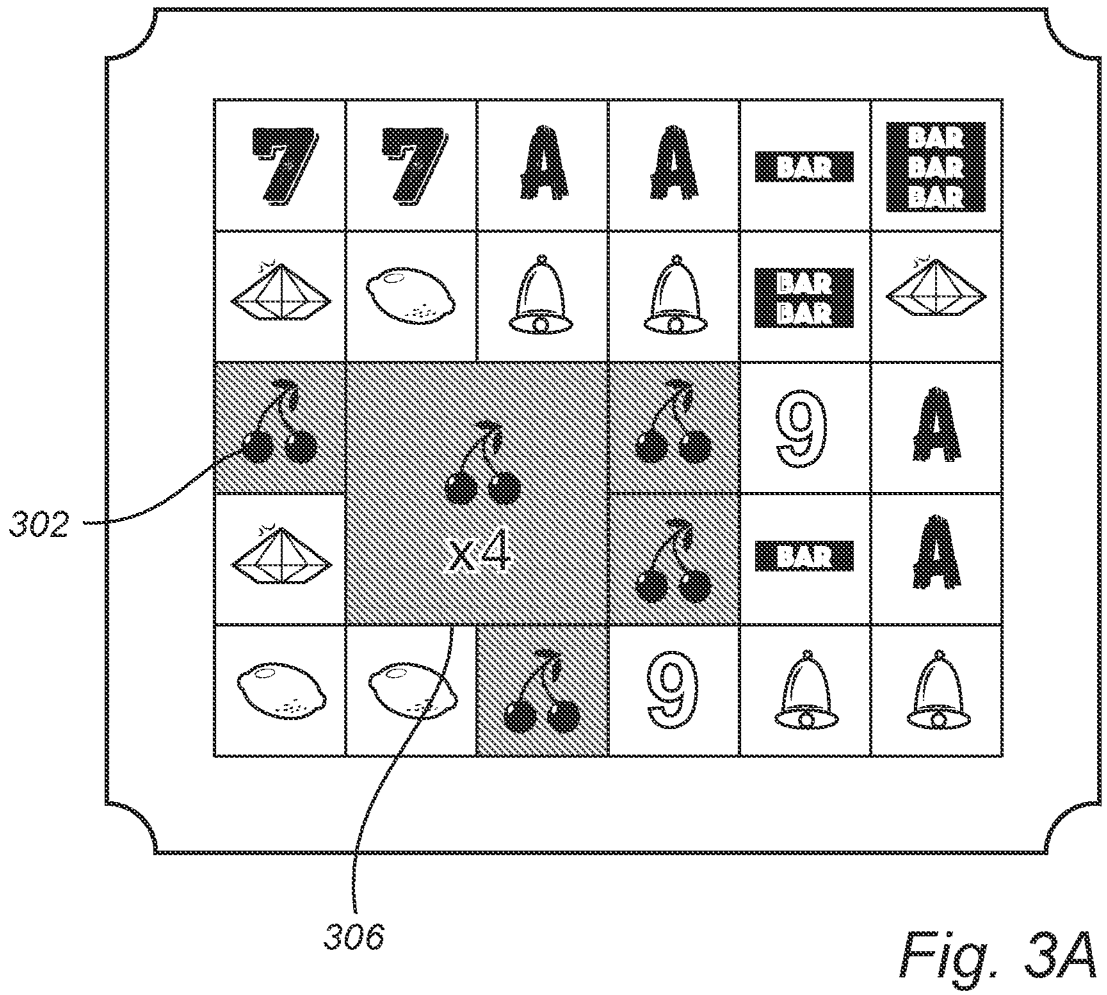
FIGS. 3A and 3B present exemplary illustrations of operations of different tables according to different embodiments of the present disclosure.
Figure 3B:
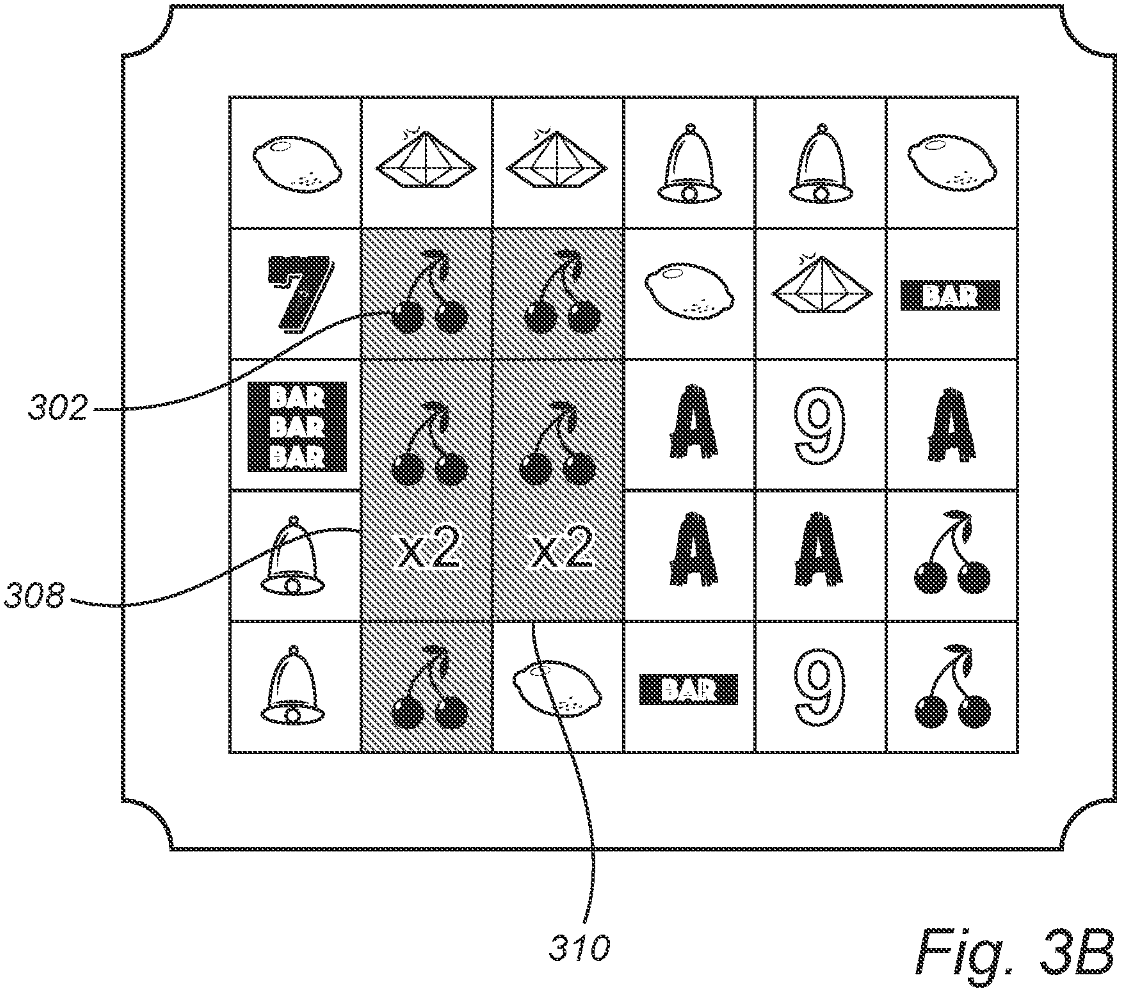
Figure 4:
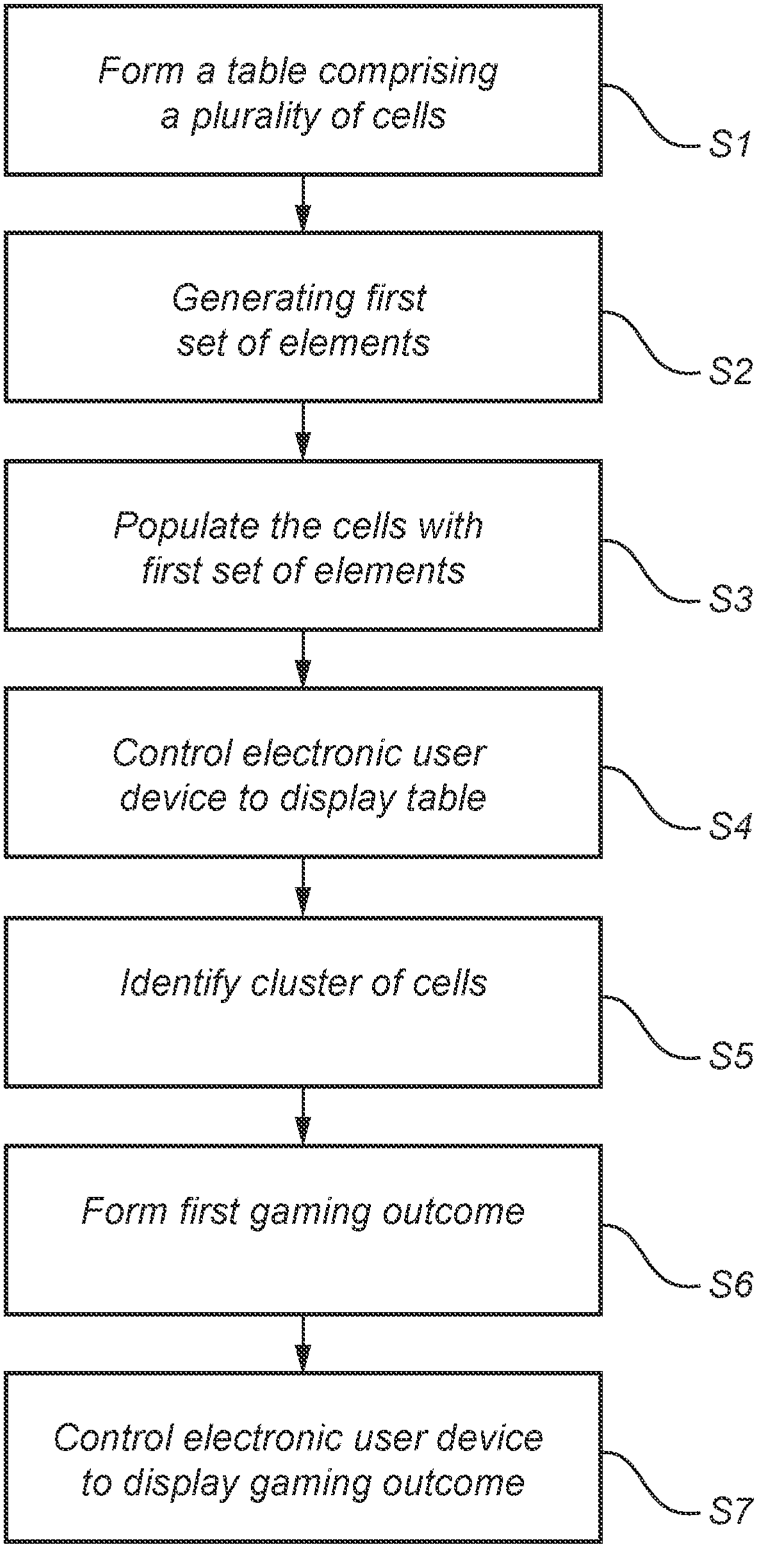
FIG. 4 is a flow chart illustrating the exemplary steps for operating the gaming system as shown in FIG. 1.

Turning now to FIGS. 3A and 3B in conjunction with FIG. 4, illustrating different tables according to different embodiments of the present disclosure. In FIG. 3A there is first shown an initial table 300 comprising a plurality of cells 302 arranged in rows and columns, corresponding to the table as shown in FIG. 2, e.g. displayable at a display screen of any of the client devices 106, 108, 110.

As is exemplified in FIG. 3A, the server 102 has formed, S1, and then generated, S2, a first set of elements which have been arranged to populate, S3, the initial table 300. The server has then controlled, S4, the client device 106, for example, to display the populate table 300. In the case of a game of chance the elements may be at least semi-randomly generated and similarly the positioning of the elements within the table 300 may be semi-randomly selected. The set of elements comprises a plurality of predefined elements types, in FIG. 3A, a cherry 304, a diamond, the number seven, a heart etc. and an extended element 306, also being of the element type cherry. As is illustrated in FIG. 3A, the extended element 306 populates four cells.

The server 102 will then identify, S5, a number of cells of the table being populated with matching elements. In the example as presented in FIG. 3A, it is necessary that the table 300 comprises at least five matching elements. In FIG. 3A, the table 300 comprises four "cherries" 304 of a regular size (i.e. populating a single cell), i.e. matching elements. However, in FIG. 3A, the table also comprises the extended element 306, where the extended element 306 as mentioned above also is a "cherry". Five "cherries" are thus being identified as a cluster. In the specific embodiment as is shown in FIG. 3A, the cluster is here exemplified as adjacently arranged cells.

In the example as shown in FIG. 3A, the extended element 306 will only be "counted" as a single matching element. However, the extended element 306 will influence the first gaming outcome in that it will be counted as more than one element in the determination of the outcome. This can be dependent on the size of the extended element or on a number assigned to the extended element. In this case a number 2 has been assigned to the extended element 306 and therefore the extended element will count as two symbols in the determination of the score such that a cluster of six cherries will be considered for the final score.

Alternatively, as is presented in FIG. 3A, the extended element 306 can be provided with a multiplication factor (here four). The multiplication factor will influence the cluster, meaning that the server 102 when forming, S6, the first gaming outcome. The formation of the first gaming outcome is in turn performed by the server 102 by matching of the identified cluster of cells with a plurality of predefined cluster formations. The first gaming outcome is also preferably dependent on the bet 208 placed by player, as mentioned above.

Once the first gaming outcome has been formed, the server 102 will subsequently control the client device 106 to display the gaming outcome at the display screen.

Following the presentation of the first gaming outcome at the client device 106, the next game in the series of consecutive games is executed, as is exemplified in FIG. 3B. The general operation follows the flow as is presented in relation to FIG. 3A, with the difference that the extended element 306 is subdivided. In FIG. 3B the extended element 306 is subdivided into two separate and equally sized portions, where each portion now populate two cells. Accordingly, the initial extended element 306 was a 2×2 cell element and is now subdivided into two 2×1 cell element 308 and 310. This subdivision will however only take place in case the extended element 306 forms part of the identified cluster of cells.

In line with the discussion above, the multiplication factor follows with the subdivision. In the example as is shown in FIG. 3B, the multiplication factor will also be subdivided into "two" (as with the extended element 306). Accordingly, each subdivided extended element 308, 310 is assigned a multiplication factor of two. The subdivided extended element 308, 310 are again subdivided (if being part of an identified cluster of cells) into further portions (not shown) and the multiplication factor may correspondingly follow. As such, the extended elements will eventually "disappear", once the extended element has been subdivided such that it only populates a single cell.

It should however be understood that the multiplication factor as an alternative may "stay" the same also when following with the subdivided extended elements. Accordingly, even if the extended element is divided into smaller portions, each of these portions (e.g. the subdivided extended element 308, 310) may be assigned the "original" multiplication factor.

It should be understood that the examples above are just for provided for explaining the general concept of the present disclosure. Accordingly, the examples are in no way limiting to the general scope of the present disclosure.

In summary, the present disclosure relates to a computer implemented method performed by a gaming system adapted to execute a series of consecutive games, the gaming system comprising a server arranged in communication with an electronic user device using a network connection, the electronic user device comprising a display screen, wherein the method comprises the steps of forming, at the server, a table having a predetermined dimension and comprising a plurality of cells, generating, at the server, a first set of elements arranged to completely populate all of the plurality of cells of the table, each generated element being one of a plurality of predefined element types, wherein the first set of elements comprises at least one extended element arranged to populate a first predefined number of cells of the table, the predefined number of cells being at least four cells, populating, at the server, the plurality of cells of the table with the first set of elements, controlling, using the server, the electronic user device to display the table at the display screen, identifying, at the server, a cluster of cells of the table being populated with matching elements, forming, at the server, a first gaming outcome based on a successful matching of the identified cluster of cells with a plurality of predefined cluster formations, controlling, using the server, the electronic user device to display the gaming outcome at the display screen, wherein the extended element is subdivided into separate portions arranged to populate the first predefined number of cells of the table only if the extended element forms part of the identified cluster of cells and a first gaming outcome has been formed.

An advantage following such a possibility is an improved attraction power to the game, thus potentially allowing for the player to remain playing the game for an increased duration as compared to previously known similar operational schemes. This could potentially be beneficial to both the player participating in the game and the gaming operator providing the game.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed present disclosure, from a study of the drawings, the disclosure, and the appended claims. The person skilled in the art realizes that the present disclosure is not limited to the preferred embodiments.

The invention claimed is:

1. A computer implemented method performed by a gaming system adapted to execute a series of consecutive games, the gaming system comprising a server arranged in communication with an electronic user device using a network connection, the electronic user device comprising a display screen and being adapted to present a graphical user interface (GUI) at the display screen, wherein the method comprises the steps of:

forming, at the server, a table having a predetermined dimension and comprising a plurality of cells, generating, at the server, a first set of elements arranged to completely populate all of the plurality of cells of the table, each generated element being one of a plurality of predefined element types, wherein the first set of elements comprises at least one extended element arranged to populate a first predefined number of cells of the table, the predefined number of cells being two or more and preferably at least four cells, populating, at the server, the plurality of cells of the table with the first set of elements, controlling, using the server, the electronic user device to display the table at the display screen, identifying, at the server, a cluster of cells of the table being populated with matching elements, forming, at the server, a gaming outcome based on a successful matching of the identified cluster of cells with a plurality of predefined cluster formations, forming, at the server, a graphical representation of at least one of the table or the gaming outcome, distributing, from the server and to the electronic user device, the graphical representation, controlling, using the server, the electronic user device to display the gaming outcome at the display screen, wherein:

the extended element influences the first gaming outcome based on its size, a number assigned to the extended element, a multiplication factor assigned to the extended elements or a combination thereof.

2. The method according to claim 1, wherein the multiplication factor and the predefined number of cells decreases in a subsequent iteration of the series of consecutive games if the extended element forms part of a successfully matched identified cluster of cells.

3. The method according to claim 1, wherein the extended element is subdivided into separate portions arranged to populate the first predefined number of cells of the table only if the extended element forms part of the identified cluster of cells and the gaming outcome has been formed.

4. The method according to claim 3, wherein the extended element is subdivided into a second predetermined number of cells being less than the first predetermined number of cells.

5. The method according to claim 3, wherein the multiplication factor is assigned to the separate portions of the extended element when being subdivided.

6. The method according to claim 5, wherein the multiplication factor is divided depending on the number of cells the extended element is subdivided into.

7. The method according to claim 1, wherein the multiplication factor has a predefined range.

8. The method according to claim 7, wherein the range is between 1-10.

9. The method according to claim 1, further comprising the step of:

receiving, at the server, a bet from the electronic device, wherein the determination of the gaming outcome is further dependent on the bet.

10. A gaming system comprising a server arranged in communication with an electronic user device using a network connection, the electronic user device comprising a display screen and being adapted to present a graphical user interface (GUI) at the display screen, wherein the server is adapted to:

form a table having a predetermined dimension and comprising a plurality of cells, generate a first set of elements arranged to completely populate all of the plurality of cells of the table, each generated element being one of a plurality of predefined element types, wherein the first set of elements comprises at least one extended element arranged to populate a first predefined number of cells of the table, the predefined number of cells being two or more, preferably at least four cells, populate the plurality of cells of the table with the first set of elements, control the electronic user device to display the table at the display screen, identify a cluster of cells of the table being populated with matching elements, form a gaming outcome based on a successful matching of the identified cluster of cells with a plurality of predefined cluster formations, form a graphical representation of at least one of the table or the gaming outcome, distribute, to the electronic user device, the graphical representation, control the electronic user device to display the gaming outcome at the display screen, wherein:

the extended element influences the first gaming outcome based on its size, a number assigned to the extended element, a multiplication factor assigned to the extended elements or a combination thereof.

11. The system according to claim 10, wherein the extended element is subdivided into separate portions arranged to populate the first predefined number of cells of the table only if the extended element forms part of the identified cluster of cells and the gaming outcome has been formed.

12. The gaming system according to claim 11, wherein the server is further adapted to subdivide the extended element into a second predetermined number of cells being less than the first predetermined number of cells.

13. The gaming system according to claim 12, wherein the multiplication factor is assigned to the separate portions of the extended element when being subdivided.

14. The gaming system according to claim 13, wherein the multiplication factor is divided depending on the number of cells the extended element is subdivided into.

15. The gaming system according to claim 10, wherein the multiplication factor has a predefined range.

16. The gaming system according to claim 15, wherein the range is between 1-10.

17. The gaming system according to claim 10, wherein the server is further adapted to:

receive a bet from the electronic user device, wherein the determination of the gaming outcome is further dependent on the bet.

18. A computer program product comprising a non-transitory computer readable medium having stored thereon computer program means for operating a gaming system, the gaming system comprising a server arranged in communication with an electronic user device using a network connection, the electronic user device comprising a display screen and being adapted to present a graphical user interface (GUI) at the display screen, wherein the computer program product comprises:

code for forming, at the server, a table having a predetermined dimension and comprising a plurality of cells, code for generating, at the server, a first set of elements arranged to completely populate all of the plurality of cells of the table, each generated element being one of a plurality of predefined element types, wherein the first set of elements comprises at least one extended element arranged to populate a first predefined number of cells of the table, the predefined number of cells being two or more, preferably at least four cells, code for populating, at the server, the plurality of cells of the table with the first set of elements, code for controlling, using the server, the electronic user device to display the table at the display screen, code for identifying, at the server, a cluster of cells of the table being populated with matching elements, code for forming, at the server, a gaming outcome based on a successful matching of the identified cluster of cells with a plurality of predefined cluster formations, code for forming, at the server, a graphical representation of at least one of the table or the gaming outcome, code for distributing, from the server and to the electronic user device, the graphical representation, code for controlling, using the server, the electronic user device to display the gaming outcome at the display screen, wherein:

the extended element influences the first gaming outcome based on its size, a number assigned to the extended element, a multiplication factor assigned to the extended elements or a combination thereof.

* * * * *